Dec. 1, 1953 J. A. GREGOIRE 2,661,206
SUSPENSION DEVICE FOR VEHICLES
Filed March 30, 1948 6 Sheets-Sheet 1

INVENTOR
Jean Albert Gregoire
by
Jewett, Mead & Browne
ATTORNEYS

Dec. 1, 1953 J. A. GREGOIRE 2,661,206
SUSPENSION DEVICE FOR VEHICLES
Filed March 30, 1948 6 Sheets-Sheet 2

INVENTOR
Jean Albert Gregoire
by Jewett, Mead & Browne
ATTORNEYS

Dec. 1, 1953   J. A. GREGOIRE   2,661,206
SUSPENSION DEVICE FOR VEHICLES
Filed March 30, 1948   6 Sheets-Sheet 3

INVENTOR
Jean Albert Gregoire
by Jewett, Mead & Browne
ATTORNEYS

Dec. 1, 1953  J. A. GREGOIRE  2,661,206
SUSPENSION DEVICE FOR VEHICLES
Filed March 30, 1948  6 Sheets-Sheet 4

INVENTOR
Jean Albert Gregoire
by Jewett, Mead & Browne
ATTORNEYS

Dec. 1, 1953     J. A. GREGOIRE     2,661,206
SUSPENSION DEVICE FOR VEHICLES
Filed March 30, 1948     6 Sheets-Sheet 6

INVENTOR:
Jean Albert Gregoire
by Jewett Mead & Browne
ATTORNEYS

Patented Dec. 1, 1953

2,661,206

UNITED STATES PATENT OFFICE 2,661,206

SUSPENSION DEVICE FOR VEHICLES

Jean Albert Gregoire, Paris, France

Application March 30, 1948, Serial No. 18,003

Claims priority, application France April 15, 1947

2 Claims. (Cl. 267—60)

The present invention deals with improvements to suspension means for vehicles, and more especially to suspension devices in which use is made of spiral springs for this purpose.

Its object is an improvement in the qualities of these suspension means by enabling such suspensions in each case to be given with a suitable accuracy suitable predetermined characteristics.

At the present time, the suspension springs provided for a vehicle, and especially for a motorcar, are manufactured with a degree of accuracy that leaves much to be desired, especially in regard to the diameter of the coiled spring, its pitch and length. The consequence is that, even with carefully made springs, when they are assembled on the vehicle they have not just the right length when unloaded, that is the free length assumed by the spring when not subjected to any force and the right amount of flexibility provided in advance for the kind of vehicle considered.

Now, the precise execution of these characteristic features, already essential for the setting up of suspensions of ordinary types provided with compression springs, becomes a vital point when it is a question of manufacturing suspensions with varying flexibility provided with sloping springs working under compression, or tension, such as those specially disclosed in my U. S. Patent 2,616,686.

In the case of these suspensions, as a matter of fact, the spring assumes varying slopes in regard to the axle bar, as it is inserted between spindles at each of its ends, and the exactitude of the length between spindles of the unloaded spring becomes of vital importance, as well as the actual flexibility of the spring itself. In such a system, in fact, the height of the car above the ground and the whole flexibility of the assembly, that of course varies, hinges to a great extent on the various factors under discussion.

The object of the present invention is to eliminate any defective points in the manufacture of the springs. It consists for this purpose in the provision of a device for assembling springs allowing, on the one hand the adjustment of flexibility of these springs, at least within a certain range, and on the other hand a highly accurate adjustment of the free length of these springs or the length of these springs under a fixed load.

In accordance with the invention, in the case of coil springs for instance, the adjustment of the degree of flexibility will be carried out by fixing in position and locking a certain number of coils of the spring over a certain accurately defined length, the adjustment of the length being effected, furthermore, by shortening or lengthening, by means of a screw for instance, the device for hooking on the spring at one or both of its ends.

In accordance again with the invention, the device for adjustment of flexibility may be fixed to one end of the spring and the contrivance for regulating the length may be fastened to the other end of this spring. These two devices may just as well be arranged on the same end of the spring or, if considered necessary, a dual adjustment may be fitted at each of the two ends.

In accordance also with the invention, furthermore, provision may be made preferably of a locking means used for the permanent settling of the length of the spring at the start and its flexibility once the latter have been adjusted, this being done so as to prevent any subsequent getting out of order.

With regard more especially to the method used for adjustment of flexibility, it may be formed either by an expander or by a spiral coupling that is screwed up more or less on the outside or inside. This system may be formed also of a clamping device locking a longer or shorter length of the spring coils.

Other objects and characteristics of the invention will make their appearance besides in the following disclosure relating to the attached drawings that illustrate in quite a diagrammatic way, as examples, various specific embodiments of my invention.

Figure 1:
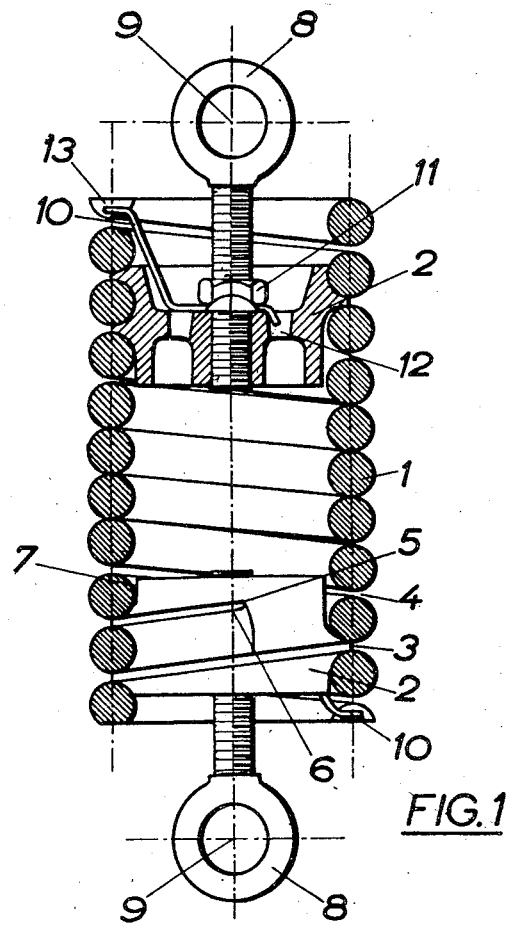
Fig. 1 is a view partly in elevation and partly in cross section of a coil spring for suspension provided with the adjustment device in accordance with my invention.
Figure 2:
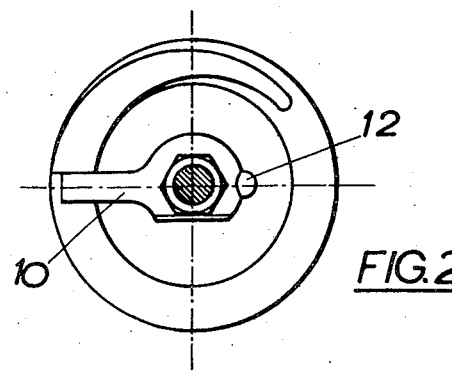
Fig. 2 is an end view showing the clamping and locking device.

In Fig. 1, the coil spring 1 operating under tension is provided at each of its ends with a ferrule 2 screwing into the coils of this spring like a screw in a nut.

In accordance with the invention, these ferrules 2 are provided with screw threads 3 of which the thickness is fixed so that they stand up to the force exerted on the spring, and they are made preferably slightly thicker than the space 4 between adjacent coils so as to enable a clamping to be obtained on screwing in. This thread 3 includes a clean break at 5 so that the working portion of the spring is clearly defined at this particular point, a rounded-off edge 6 avoids moreover the concentration of fatigue at this spot. Use besides is made of the spaces 4 only over the length provided for adjustment. Consequently, in accordance with the invention, the springs may be manufactured so as to be provided with this spacing only over the length of this adjustment, the other coils remaining close together. The bottom part of the thread 7 is cut out as shown beyond point 5 so that the working coils may not rub on the ferrule 2 and cause any creaking.

The flexibility of the spring that is a direct function of the number of free coils between each ferrule, may be adjusted by screwing up or unscrewing the latter to a varying extent and, on account of the presence of threads that are cut off sharply at 5, this adjustment may be carried to a very fine point. Besides, there is a piece 8 that is screwed into each of these ferrules 2 and is intended for the hooking on of the spring 1.

An adjustment may thus be made, by unscrewing the pieces 8 more or less, of the distance between the axes 9 of these pieces 8, and this with remarkable precision.

To prevent misadjustment of the system when operating, a brake of sheet metal 10 clamped by the nut 11 cooperating with the threaded piece 8 and bent over into a hole 12 cut in the ferrule 2, bears on an end 13 of the spring that is cut specially for this purpose. With the provision of a brake 10 at each end of the spring, the latter cannot come unscrewed in either direction.

The following procedure is followed, in accordance with the invention, for adjusting the characteristics of the spring:

The first operation is the adjustment of the flexibility; it will be attempted, as a rule, to make the spring take a given elongation when its load varies between $a$ and a larger value $b$ for instance when the load rises from 100 to 200 kilos. The degree of flexibility is then, as is well known, the ratio of the difference of length to the difference in load. To carry out the desired adjustment, it is sufficient to subject the spring to the two loads considered and to adjust the position of the ferrule or ferrules 2 in the coils, so that the elongation of the spring amounts to the required figure when passing from one load to the other.

Figure 3:
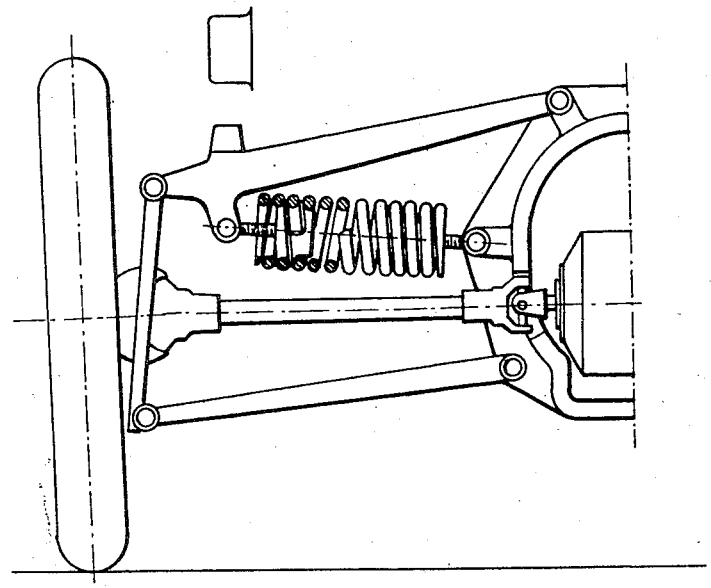
Fig. 3 shows as an example the adaptation of the spring to the front suspension of a motor car.

With the flexibility thus adjusted, the next step is the adjustment of the starting length. It is sufficient to screw up more or less the hooking pieces 8 in the ferrules 2 to reach this point. The spring, after being adjusted as regards length and flexibility, may then be assembled at once on the suspension device such as that illustrated, for instance, in Fig. 3, and the suspension will behave then with the required exactitude.

Figure 4:
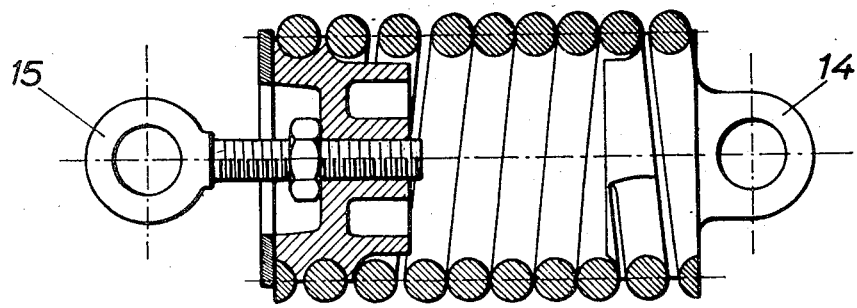
Figs. 4, 5, 6, 7, 8, 9, 10, 11, 12, 13, 14 and 15 illustrate various modifications of the device according to the invention.

In the example shown in Fig. 4, the device is similar to that of Fig. 1, except that the adjustment for flexibility is carried out solely at the end 14 where the hooking system besides is fastened directly to the ferrule and constitutes a solid unit with the latter while the adjustment for length takes place at the other end at 15 in the same way as in the case of Fig. 1.

Figure 5:
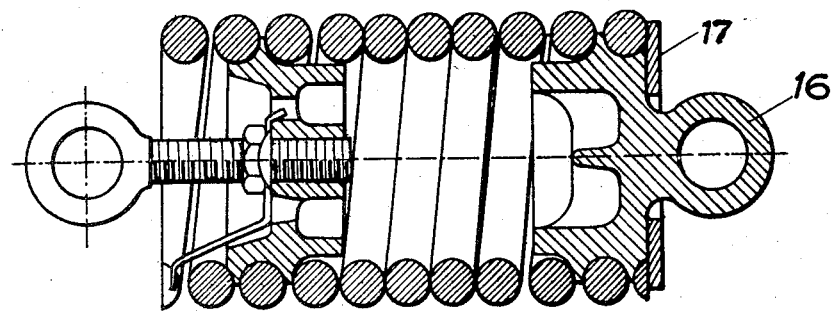

In Fig. 5, both ajustments are made at the same end of the spring, as in the case of Fig. 1, while the other end 16 is non-adjustable, with the ferrule screwed up tight and fitted up against a stop 17.

Figure 6:
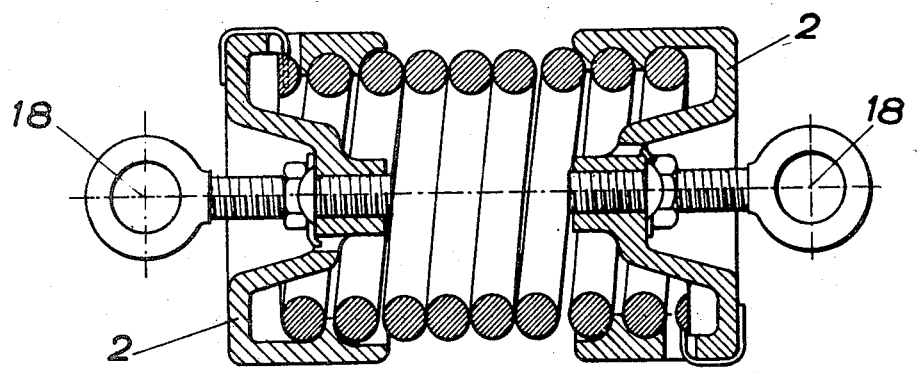

In Fig. 6, the ferrule 2, instead of being screwed inside the spring as in Fig. 1, is screwed up on the outside. In this case the hinge axis 18 is located beyond the spring.

Figure 7:
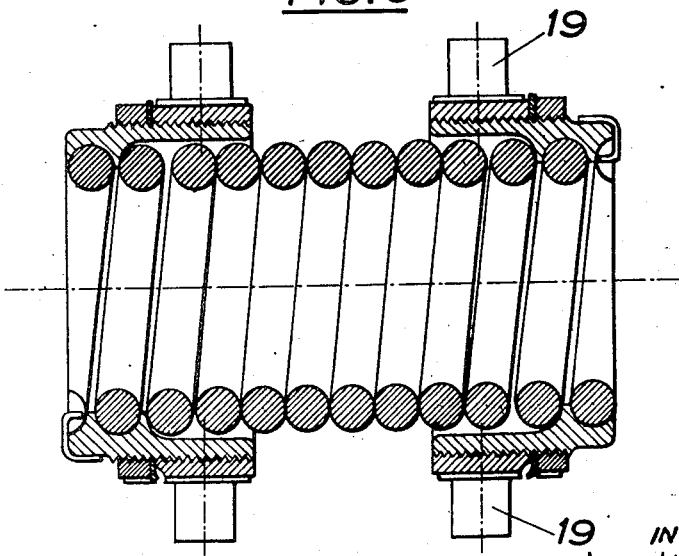

Fig. 7 illustrates a similar form of execution, but in which the hooking of the spring instead of being made through an eye, as previously, is carried out by two lined up semi-axes 19, located on each side of the spring in a plane containing the axis of the spring or passing close to this axis. The position in the lengthwise direction is given by the reckoned distance between the axes. This arrangement allows a reduction in the distance between the two axes with reference to the length of the spring. This style of assembly may be adapted either at both ends as in Fig. 7, or at a single end, the other end being fitted up as in Fig. 1 for instance.

Figure 8:
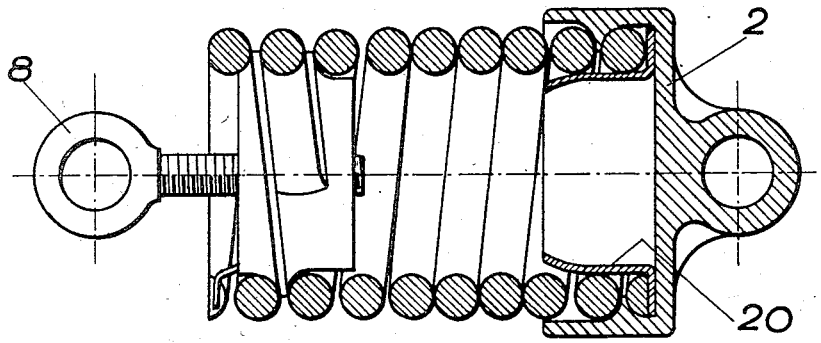

In Fig. 8, at one of its ends the ferrule 2 is finished off with a counter-bracing pan 20 that is not adjustable. At the other end, a ferrule 2 and a hooking piece 8 similar to those of Fig. 1, may be fitted.

Figure 9:
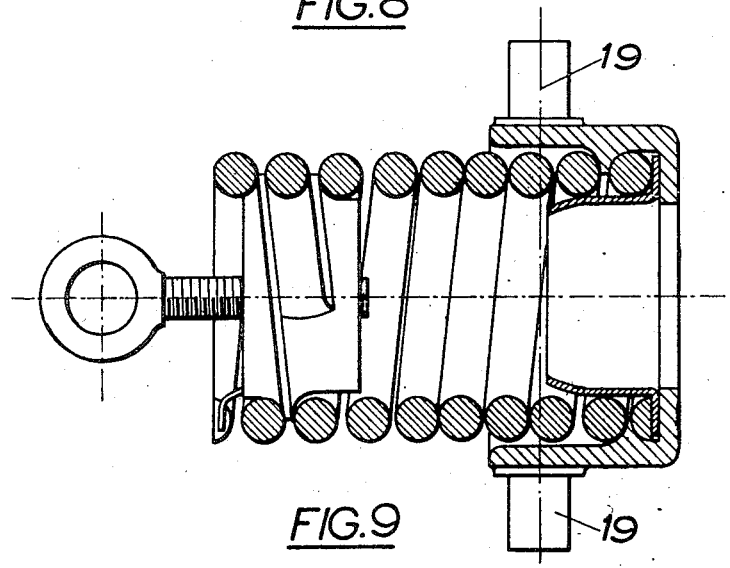

In Fig. 9, there is a similar assembly but with two semi-axes 19 located on each side of the spring and pan arrangement.

Figure 10:
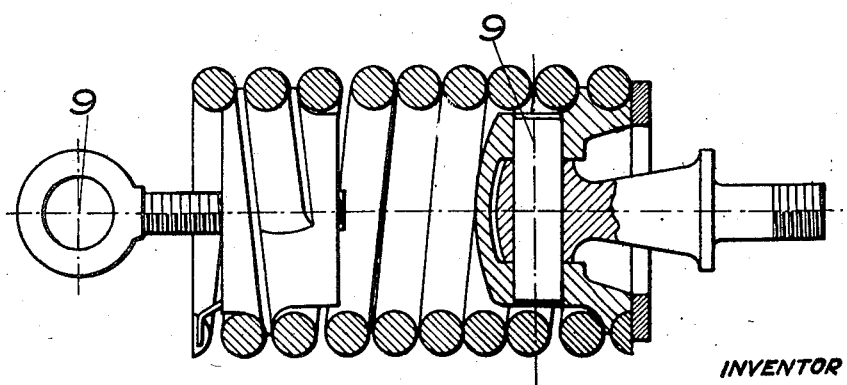
Figure 11:
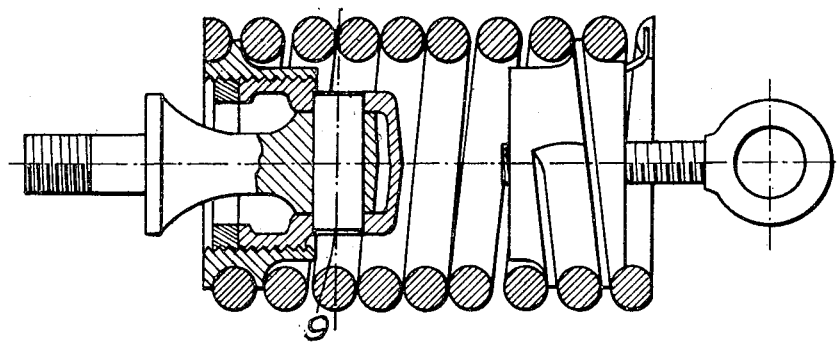

Fig. 10 varies from the preceding ones by the fact that the inserted transversal axis is arranged inside the spring so as to decrease the distance between axes 9—9. In the same way, in Fig. 11 the hinged axis 9 is carried also inside the spring, but a single or dual adjustment may be provided by adjustably screwing the axes bearing member into the ferrule.

Figure 12:
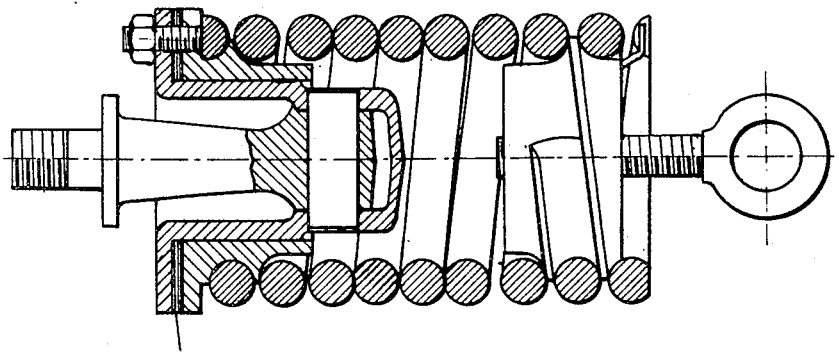

In Fig. 12, the adjustment for length may be worked with the help of liners or shims 21.

Figure 13:
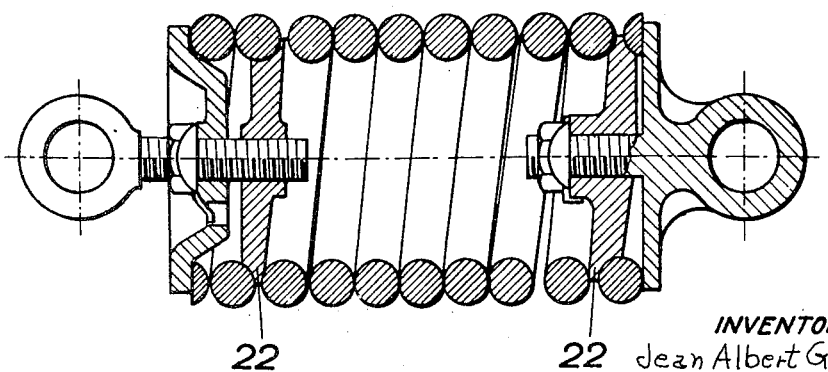

In Fig. 13, the ferrules 2 have been replaced by strap-pieces 22 that nip the spring wire and that consequently lock a certain number of coils of the latter, these strap-pieces playing the same part as the ferrules 2.

Figure 14:
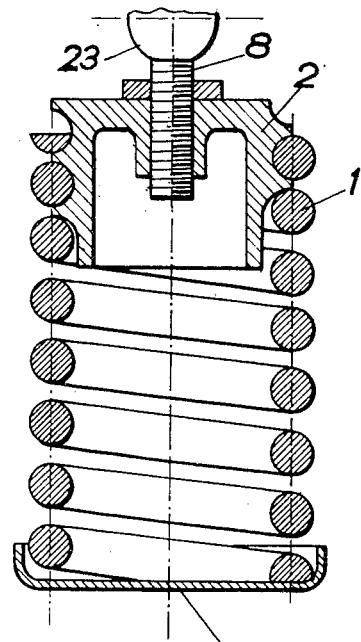
Figure 15:
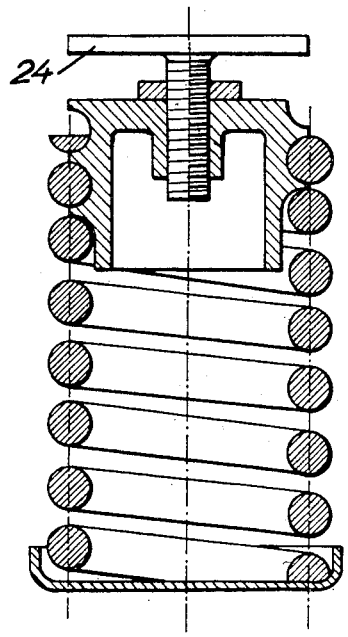

Fig. 14 shows the adaptation of the invention to a spring device working under compression. In this particular case the flexibility and length adjustments are set on the same side of the spring, the ferrule 2, by being screwed into the spring 2, allowing the regulation of the flexibility while the piece 8, by being screwed into the ferrule 2, adjusts the length. This piece 8 may be provided with a pivotal joint 23 or a centering piece 24 according to what is required (Fig. 15).

The other end of the spring rests in an adjusting pan 25 fixed rigidly either with the axle or with the frame. The adjustments may be provided also if desired at each end of the spring.

Figure 16:
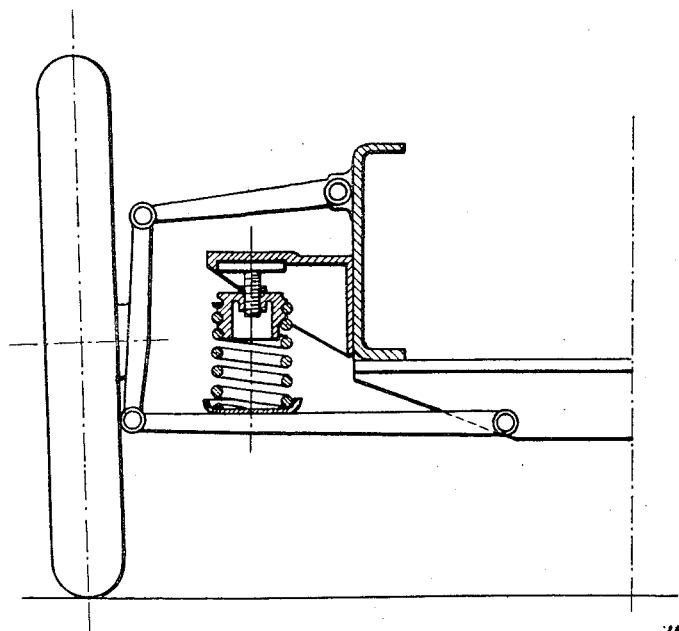
Fig. 16 shows the invention applied to a standard front suspension.

This compression spring system may be adapted, for instance, to a standard front suspension by a parallel motion as shown in Fig. 16.

Numerous modifications, of course, may be introduced to the devices disclosed and applications thereof, without unduly widening the scope of the invention as defined in accompanying claims.

Use may be made of the device, especially, for any vehicle suspension, whatever it may be, employing coil springs. Moreover, the method of adjustment as laid down by the invention enables not only the spring to have a predetermined starting flexibility and length, but also allows these two amounts to be varied and adjusted, which consequently results through successive trials in reaching a point where the best characteristics of vehicle suspension are achieved.

What I claim is:

1. In a suspension for vehicles: a coil suspension spring; an integral, screw threaded anchor member to transmit stresses between said spring and a vehicle frame; the screw threads of said member having the pitch of the coils of the spring; the separation of the threads conforming to the wire of the spring, and the threads of a thickness slightly greater than the normal separation of said successive coils of the spring; said member acting to segregate certain coils of the spring from participation in the action of the spring as such; positive locking means acting between the member and the spring to prevent relative rotation therebetween; means to transmit stresses from said anchor member to the vehicle frame, having adjustable screw threaded connection with the anchor member, whereby flexibility of the spring may be varied by variation of the number of spring coils which are segregated, and the distance between points of attachment to the frame and to the wheeled support of the vehicle frame may be varied by the adjustment of the screw threaded connection between the anchor member and the last named stress transmitting means.

2. In a suspension for vehicles, comprising a suspended part and an unsuspended part, the combination of a coil suspension spring, an integral anchor member carrying each end of the spring, at least one of the anchor members being screw-threaded and having its screw threads engaging over an adjustable length, the corresponding terminal coils of the spring, positive locking means adapted to prevent a relative rotation between the screw-threaded anchor member and the spring after adjustment of the relative position of said member and spring, means for transmitting the stresses from each anchor member respectively to the suspended and to the unsuspended part of the vehicle, at least one of said means including an adjustable screw-threaded connection with the corresponding anchor member to adjust the overall length of the system including the spring, the anchor members and last-mentioned means.

JEAN ALBERT GREGOIRE.

References Cited in the file of this patent

UNITED STATES PATENTS

| Number | Name | Date |
|---|---|---|
| 2,095,545 | Endsley | Oct. 12, 1937 |
| 2,190,368 | Morgan | Feb. 13, 1940 |
| 2,248,447 | Wood | July 8, 1941 |
| 2,265,629 | Christiansen | Dec. 9, 1941 |
| 2,400,425 | Liber | May 14, 1946 |

FOREIGN PATENTS

| Number | Country | Date |
|---|---|---|
| 411,824 | Great Britain | June 12, 1934 |
| 591,334 | Great Britain | Aug. 14, 1947 |